United States Patent
Mueller

(10) Patent No.: US 7,401,128 B1
(45) Date of Patent: Jul. 15, 2008

(54) METHOD AND APPARATUS FOR MANAGING USER DEFINED PORTAL CHANNELS

(75) Inventor: Thomas Mueller, Fremont, NE (US)

(73) Assignee: Sun Microsystems, Inc., Santa Clara, CA (US)

( * ) Notice: Subject to any disclaimer, the term of this patent is extended or adjusted under 35 U.S.C. 154(b) by 848 days.

(21) Appl. No.: 10/850,331

(22) Filed: May 20, 2004

(51) Int. Cl.
    *G06F 15/16* (2006.01)
(52) U.S. Cl. .................. 709/217; 709/203; 709/250
(58) Field of Classification Search ......... 709/203–205, 709/217–219, 250
    See application file for complete search history.

(56) References Cited

U.S. PATENT DOCUMENTS

| | | | |
|---|---|---|---|
| 6,813,715 B2 * | 11/2004 | Yi ............................. | 726/15 |
| 6,832,263 B2 * | 12/2004 | Polizzi et al. ............... | 709/203 |
| 6,950,991 B2 * | 9/2005 | Bloomfield et al. ......... | 709/217 |
| 7,269,664 B2 * | 9/2007 | Hutsch et al. ............... | 709/246 |
| 7,272,629 B2 * | 9/2007 | Yamaura et al. ............ | 709/203 |
| 7,278,108 B2 * | 10/2007 | Duarte et al. ................ | 709/204 |
| 7,310,516 B1 * | 12/2007 | Vacanti et al. .............. | 709/217 |
| 7,321,923 B1 * | 1/2008 | Rosenberg et al. .......... | 709/217 |

* cited by examiner

*Primary Examiner*—Bharat N Barot
(74) *Attorney, Agent, or Firm*—Osha Liang LLP

(57) ABSTRACT

A method for generating a channel for displaying channel content for a portal by a user, involving accessing a portal server via a network using a client computer, accessing a channel generating link in response to the user interacting with a content link of the portal server, accessing an information inputting interface in response to the user interacting with the channel generating link, inputting information to the portal server using the information inputting interface wherein said information describes the channel, and generating the channel in response to the inputting information to the portal server.

28 Claims, 7 Drawing Sheets

METHOD AND APPARATUS FOR MANAGING USER DEFINED PORTAL CHANNELS

BACKGROUND

The Internet includes a large network made up of a number of smaller networks located world-wide, which are used in personal, commercial, academic, government, and other endeavors. The World Wide Web, sometimes referred to as "the Web" and well known by its initials in the "www" prefixes of many Web addresses, includes an Internet based facility that links documents across remote and local distances.

A "Web page" includes a World Wide Web (e.g., Web) document, which is a coded text file. An address on the Web (or on another Internet facility) is called a Uniform Resource Locator (URL), and defines the route across the Internet to a particular file, such as a Web page. A Web site includes a server computer (server) containing Web pages and other files and strives to be continuously online to the Internet.

Portals function as Web supersites that provide users with various services. Such services can include email, Web searching, online shopping, news, directories (such as white and yellow pages functionalities), discussion groups, and links to other sites, among others. Portals organize information thereon into channels, sometimes referred to as "portlet windows." The information for a channel is provided by a content provider, which is sometimes referred to as a portlet.

Channels can be devoted to or concentrated towards a particular type of information content and may describe the browser window and the information behind it. For instance, channels exist on major portals for bookmarks, email, news headlines, stock quotes, sports scores, etc. Bookmarks provide functionality wherein the addresses (e.g., URL) of certain Web sites are stored for quick and handy access by a user to a favorite or frequently used (e.g., visited) Web site, which can save the user time and effort.

A portal user has limited options for selecting a channel. Once selected, a user can arrange the channel as desired, within limits. Typically, an entity that administers the portal (e.g., a portal administrator) renders a fixed number of channels available to a user of the portal. However, in existing portals only one or a fixed number of each type of channel are available, for example, a single bookmark channel and a single email channel.

For some users, this may not be ideal, or may not adequately meet the user's needs or desires. For instance, consider the user who desires two separate lists of bookmarks, one in each of two separate channels; effectively a bookmark list for each channel. Conventionally, a user requires the intervention and/or manual assistance of the portal administrator to achieve this.

With conventional portal channels, where a user desires two separate lists of bookmarks in separate channels, such as one for bookmarks associated with a project for work and another associated with personal inspirational reading, a user cannot configure the portal to provide this. Instead typically, a user is limited to a single channel for bookmarks.

Thus, bookmarks for URLs associated with the user's professional and occupational interests are typically mixed with those for the user's personal interests, as well. For a user with a large number of bookmarks in several categories, this can be cumbersome. To find the bookmark needed, the user may have to spend time sifting through unrelated bookmark listings. Therefore, some of the time that bookmarking is meant to save may be lost again.

Some portals allow users a feature of creating user-defined tabs or portal pages so as to provide the convenience of placing channels. However, such features do not allow a user to configure more than a fixed number of administrator-configured channels for a particular type of information. In one portal configuration, rich site summary channels (RSS) files exist, which describe Web sites, which can be uploaded in an EXtensilble Markup Language (XML) format, to appear as a channel on a portal page. However, this capability is not generic, in that only RSS files can be uploaded, and this process is cumbersome.

SUMMARY

In general, in one aspect, the invention relates to a method for generating a channel for displaying channel content for a portal by a user, comprising accessing a portal server via a network using a client computer, accessing a channel generating link in response to the user interacting with a content link of the portal server, accessing an information inputting interface in response to the user interacting with the channel generating link, inputting information to the portal server using the information inputting interface wherein said information describes the channel, and generating the channel in response to the inputting information to the portal server.

In general, in one aspect, the invention relates to a method for deleting a channel by a user, comprising accessing a portal server via a network using a client computer, accessing a channel deleting link in response to the user interacting with a content link of the portal server, accessing an information inputting interface in response to the user interacting with the channel deleting link, inputting information to the portal server using the information inputting interface, wherein the information describes the channel, and deleting the channel in response to inputting information to the portal server.

In general, in one aspect, the invention relates to an apparatus comprising a first window for displaying an interactive content link allowing a user to access a portal server to selectively generate and delete a channel, a second window for displaying an interactive channel generating link, the second window displayed in response to the user accessing the portal server to selectively generate and delete a channel, the interactive channel generating link allowing the user to access an interactive information inputting field for selectively generating and deleting the channel, a third window for displaying the interactive information inputting field allowing the user to input information to the portal server, the information relating to the channel, and a code generator for generating program code for selectively creating and deleting the channel in response to the information input.

In general, in one aspect, the invention relates to an apparatus comprising a first mechanism for telephonically accessing an interactive content link allowing an user to access a portal server in response to a first voice command from the user to selectively generate and delete a channel, a second mechanism for telephonically accessing an interactive channel generating link, the second mechanism activated in response to the first voice command, the interactive channel generating link allowing the user to telephonically access by a second voice command an interactive information inputting prompt for selectively generating and deleting the channel, a third mechanism for telephonically accessing an interactive information inputting prompt, in response to the second voice command, wherein the interactive information inputting prompt allows the user to input information to the portal server using a voice input, the information relating to the channel, and a code generator for generating program code for selectively creating and deleting the channel in response to the information input.

In general, in one aspect, the invention relates to a computer usable medium having a computer readable program code embodied therein for causing a computer system to execute a method for selectively generating and deleting a channel by a user, comprising accessing a portal server via a network using a client computer, accessing a channel generating link in response to the user interacting with a content link of the portal server, accessing an information inputting interface in response to the user interacting with the channel generating link, inputting information to the portal server using the information inputting interface, wherein the information describes the channel, and generating the channel in response to the inputting information to the portal server.

Other aspects of the invention will be apparent from the following description and the appended claims.

DETAILED DESCRIPTION

Figure 1:
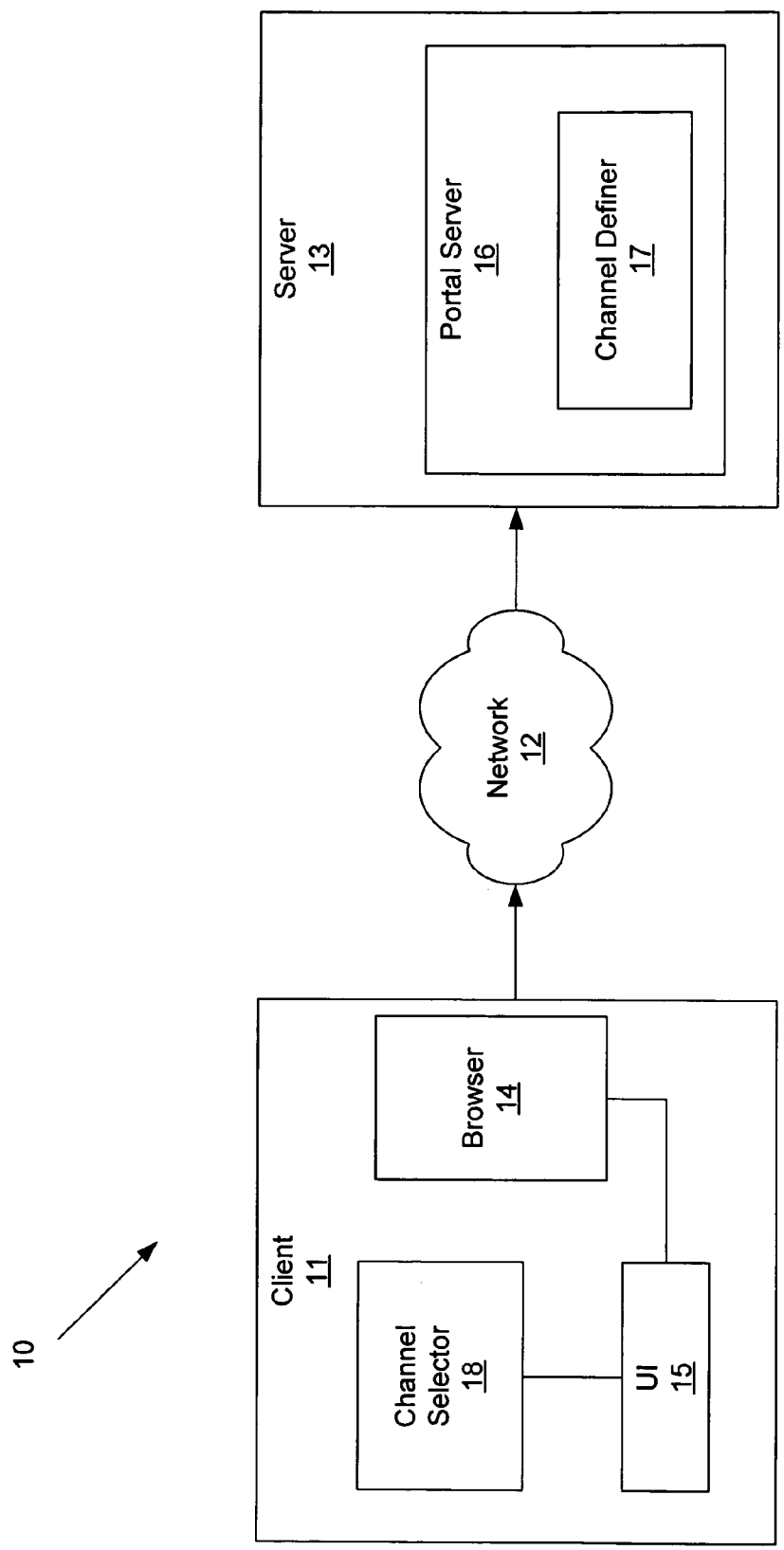
FIG. 1 shows a client-portal server network, in accordance with an embodiment of the invention.

Specific embodiments of the invention will now be described in detail with reference to the accompanying figures. Like elements in the various figures are denoted by like reference numerals for consistency.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiments of the present invention provide a method and system for providing user defined portal channels. An embodiment of the present invention provides a computer implemented method for generating a channel by a remote end user, which begins with the end user accessing a portal server via a network using a client computer. The user can interact with a content link of the portal server.

Responsive to interacting with the content link, a channel generating link or a channel deleting link is accessed. Upon interacting with the channel generating link or the channel deleting link, an information inputting interface (e.g., a graphical user interface or a voice or text activated interface) is accessed, which allows the end user to input information to the portal server. The information describes the channel to be generated or deleted. The channel is generated or deleted in response to inputting information describing the channel to the portal server.

One embodiment of the present invention provides a computer based system for selectively generating and deleting a channel by a remote end user comprising a content provider for furnishing code comprising the channel. The remote end user can interact with the computer based system for selectively generating and deleting a channel via a network, which can be the Internet or an intranet, a wide area network (WAN), or other network, using a client computer or a voice or text activated interface, for instance, telephonically.

One embodiment of the present invention provides a computer controlled programming tool having a graphical user interface (GUI), which provides a vehicle for an end user to selectively generate and delete a channel. Another embodiment of the present invention provides a computer controlled programming tool having a voice or text activated user interface, which provides a vehicle for an end user to selectively generate and delete a channel, for instance telephonically.

Thus, using an embodiment of the present invention, a remote end user of a portal is not constrained to a fixed number of specific channel types. The remote end user can generate and/or delete channels as is best suited for the user's particular needs and desires. The remote end user can accomplish this without the intervention and/or assistance of a portal administrating entity. The abilities provided by an embodiment of the present invention advantageously confer more control to the remote end user over choice, selection, and organization of channels than is provided with conventional portals.

In one or more embodiments of the present invention, a system and method for providing user-defined portal channels can be implemented on a variety of computer systems. For example, the computer systems can include a server computer, a network computer, a distributed computing system, a workstation computer system, a personal computer system, a specialized portal computing system, a mainframe computer system, or a supercomputer system. Modules of the system for providing user-defined portal channels can provide a user interface such as a graphical user interface (GUI) or a voice or text activated user interface, such as for allowing a user to telephonically select a new portal channel, and can be implemented in software, firmware, and/or hardware or any combination of software, firmware, and/or hardware.

Portions of the detailed descriptions of embodiments of the invention that follow are presented and discussed in terms of processes. Although specific steps and sequence thereof are disclosed in figures herein (e.g., FIGS. 5, 6) describing the operations of these processes, such steps and sequence are exemplary. Embodiments of the present invention are well suited to performing various other steps or variations of the steps recited in the flowcharts of the figures herein, and in another sequence than the sequence depicted and described.

In one embodiment, such processes are carried out by processors and electrical/electronic components under the control of computer readable and computer executable instructions. The computer readable and computer executable instructions reside, for example, in data storage features, memory, registers and other components of the computer system deploying the system for providing user defined portal channels. However, the computer readable and computer executable instructions may reside in any type of computer readable medium.

FIG. 1 shows a client-portal server network environment 10, according to one embodiment of the present invention. The client-portal server network environment 10 includes a client computer 11, running a Web browser 14. Embodiments of the present invention may function with various well known Web browsers, examples of which include Explorer™, Netscape Navigator™, Mozilla, and others. The client computer 11 may also provide a user interface 15.

The client computer 11 is connected via a network 12 to a server computer 13. The network 12 may include the Internet, an intranet, a wide area network (WAN), or another network. The server computer 13 deploys a portal server 16. Embodiments of the present invention may function with various portal servers, examples of which include the Java™ System Portal Server (commercially available by SUN Microsystems, Inc., a corporation in Santa Clara, Calif.), other portal servers used by service providers, such as My.Yahoo.com and others, and other portal servers.

The portal server 16 includes a user selectable channel definer module 17. The channel definer 17 provides the user with the ability to select an arbitrary number of channels (i.e., portlet windows) of various types. The channel selection may be made at the client computer 11, for instance using a user interactive channel selector 18, which can work with the user interface module 15.

The user interface module 15, in one embodiment, includes a GUI. In one embodiment, the user interface module 15 is a voice or text activated user interface, allowing a user for instance to select channels telephonically, by voice or text commands to manipulate the portal. Other embodiments use other user interfaces.

Figure 2:
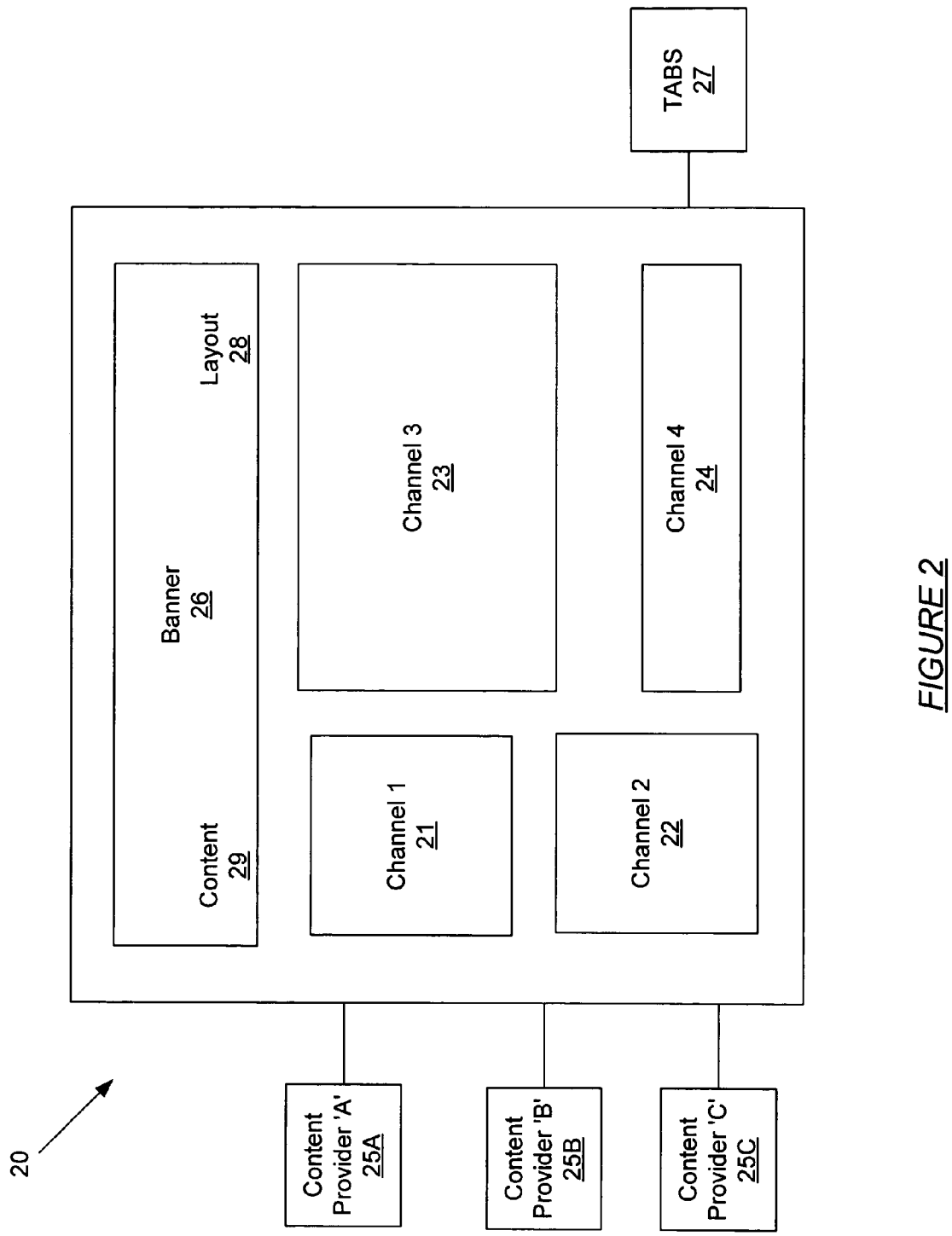
FIG. 2 shows a screen shot of a client browser window depicting multiple user defined portal channels, in accordance with an embodiment of the invention.

FIG. 2 shows a screen shot of a client browser window 20 depicting multiple user defined channels (channels), according to one embodiment of the present invention. Information for the various channels is provided by content providers 25A-25C. In one embodiment, content providers 25A-25C include a part of a portal server (e.g., portal server 13; FIG. 1). In one embodiment, content providers 25A-25C include source code, such as Java code.

The source code including content providers 25A-25C generates the content for the channel that will be presented (e.g., displayed) to a user. One of content providers 25A-25C can provide information for a number of channels. For instance, a bookmark content provider can provide an arbitrary number of bookmark channels, each including individual content.

In one embodiment, a one-to-n mapping exists between a content provider and a number of channels, such that a single content provider can provide content by changing the data. For instance, where channel 1 in window 21 and channel 2 in window 22 are both bookmark channels, and content provider 'A' 25A includes the bookmark channel provider associated with the portal displayed by browser window 20, the source code, which includes both channels, is provided by this content provider.

Conventionally, the mapping between content providers and channels is configured by an administrator. Embodiments of the present invention allow a user to configure this mapping such that the user can select multiple channels having content that while unique one from the other can be provided by the same content provider. This allows a user to have, for instance, more than one email channel, or bookmark list, in contrast to conventional portals. For example, a user can thus have one list of bookmarks relating to professional or occupational interests, and another relating to personal interests; perhaps several bookmark lists of each and other types.

Information (e.g., data) such as the HTML markup comprising individual channels are presented (e.g., displayed) to the user as a window or screen section upon the screen 20. In one embodiment, four such channels are depicted as windows 21-24. These windows can be referred to as channels. Each of the channels 21-24 allows a user to access various information.

For instance, channel 21 can represent a bookmark channel; channel 22 can represent a second bookmark channel with separate bookmarks from those of channel 21. Channels 23 and 24 can present other information to a user. For example, channel 23 can represent an email channel. Channel 24 can include another email channel, with content separate from that of channel 23, or it can include a channel having other information, such as news, sports, or financial information link.

Interactive tabs 27, which can be set by a user, allow the user to quickly and easily move between multiple pages within a browser window, such as between several pages of bookmarks. In one embodiment, tabs 27 are displayed within a banner area 26.

The banner area 26 serves, in one embodiment, as an identification function associated with the portal. Further, the banner area 26 provides interactive links such as radio buttons or the like through which the content of the channels can be addressed and the layout of screen 20 can be controlled. For instance, a layout button 28 provides the user with an interactive screen element by which to arrange the placement of elements on the screen 20. The channels 21-24 can thus be positioned, rearranged, re-sized and/or re-configured (e.g., stretched, squeezed, shifted left, right, up, down, widened, thinned, elongated, shortened, etc.)

Figure 3:
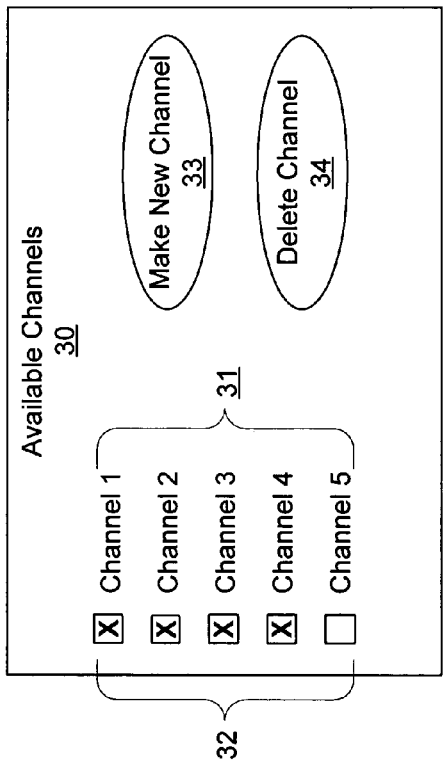
FIG. 3 shows a screen shot of a client browser window for interactively depicting available channels, in accordance with an embodiment of the invention.

The content button 29 allows a user to link to an interactive window (e.g., window 30; FIG. 3) to view and/or control (e.g., add, remove, change, etc.) content, such linking by clicking on content link 29. The exemplary implementation depicted in FIG. 2 relates to an embodiment wherein channel 20 is interactively displayed to a user on a monitor associated with a client computer, wherein a GUI can be used to allow a user thereof to interact with the portal, such as by clicking the content button 29. Other user interfaces can also effectuate this interaction. For instance, in one embodiment, the client computer comprises a digital telephone (or e.g., is replaced by any kind of telephone for purposes of contacting a portal server). In this embodiment, a voice or text activated user interface allows a user of the telephone to interact with the portal using voice or text commands.

FIG. 3 shows a screen shot of a client browser window 30 for interactively depicting available channels and accessing a tool for creating a new (or deleting an existing) portal channel, according to one embodiment of the present invention. The window 30 can be displayed upon clicking on the content link 29 (in FIG. 2) by the actions of a GUI, or by another action using another interface, such as inputting a voice command telephonically using a voice or text activated interface.

The available channels window 30 displays a list 31 of channels available. In FIG. 3, channels 1-5 are listed. The available channels window 30 also displays a column 32 of interactive check boxes, one associated graphically with each channel listed in the list 31. In FIG. 3, channels 1-4 are checked, indicating that the user has selected these channels. Channel 5 is not checked, indicating that Channel 5 is not selected. Checking and unchecking within a box within column 32 allows a user to select and deselect the associated listed channel in the list 31. Channel 5, e.g., the information content behind it, is available; however, the user has effectively selected not to display the channel by unclicking its box in column 32, or leaving it unclicked.

These channels can correspond, for example, to channels 21-24 displayed on the browser window 20, as depicted in FIG. 2. No channel is displayed for channel 5 (e.g., in FIG. 2), because it is not selected, as shown by the unchecked box 32 in FIG. 3.

Figure 4:
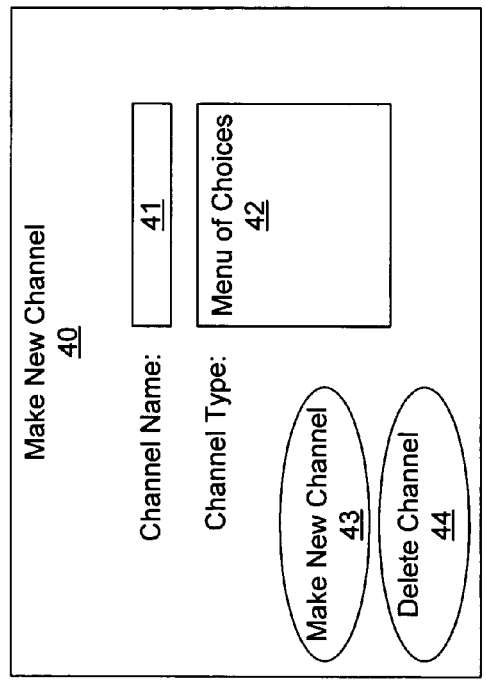
FIG. 4 shows a screen shot of a client browser window for creating a new channel, in accordance with an embodiment of the invention.

The available channels window 30 has an interactive link, such as the clickable button 33 reading 'make new channel.' The 'make new channel' link 33 allows a user to link to an interactive window (e.g., window 40; FIG. 4) to select new content by creating a new channel such as by clicking on content link 29. In one embodiment, a 'delete channel' link 34 allows a user to delete a channel. Once a new channel is made, it can be listed in the list 31. Similarly, once a channel is deleted, its listing can be expunged from the list 31.

The display of a new channel and/or the removal of the display of a deleted channel can take place upon refreshing of the available channels window 30. Further, with reference again to FIG. 2, upon refreshing page 20, a newly generated channel is displayed in a new window and a newly deleted channel's window is no longer displayed.

In one embodiment, a portal is interactively displayed to a user on a monitor associated with a client computer, wherein a GUI can be used to allow a user thereof to interact with the portal, such as by clicking the 'make new channel' link 33. Other user interfaces can also effectuate this interaction. For instance, in one embodiment, the client computer includes a digital telephone. In this embodiment, a voice or text activated user interface allows a user of the telephone to interact with the portal using voice or text commands.

FIG. 4 shows a screen shot of a client browser window 40 for interactively depicting available types of channels, according to one embodiment of the present invention. The channel making window 40 can be displayed upon clicking on the 'make new channel' link 33 (FIG. 3) by the actions of a GUI, or by another action, such as inputting a voice or text command telephonically using a voice or text activated interface. The window 40 can also function to delete a channel (e.g., upon interacting with the 'delete a channel' link 34; FIG. 3), or an analogous deleting channel window can be displayed.

The channel making window 40 has a channel name field 41 in which the channel to be created can be named. The channel to be made can be selected from among the types of channels offered by a particular portal, including bookmarks, email, and others, as described above. An interactive menu 42 of choices relating to the types of channels offered is displayed within the channel making window 40. In one embodiment, the menu 42 includes a pop-up or drop-down menu. A user can select the channel type by an action such as highlighting and clicking or otherwise entering a choice from the menu 42. A description of the new channel can be added using the channel description input field 43.

In one embodiment, the window 40 (or a window similar to window 40) can allow a channel to be deleted. The channel identified and/or described is added upon clicking the make new channel link 43. The channel identified and/or described is deleted upon clicking the delete channel link 44. Other actions such as typing 'enter' or 'return' upon identifying and/or describing the channel can complete the desired action.

Figure 8:
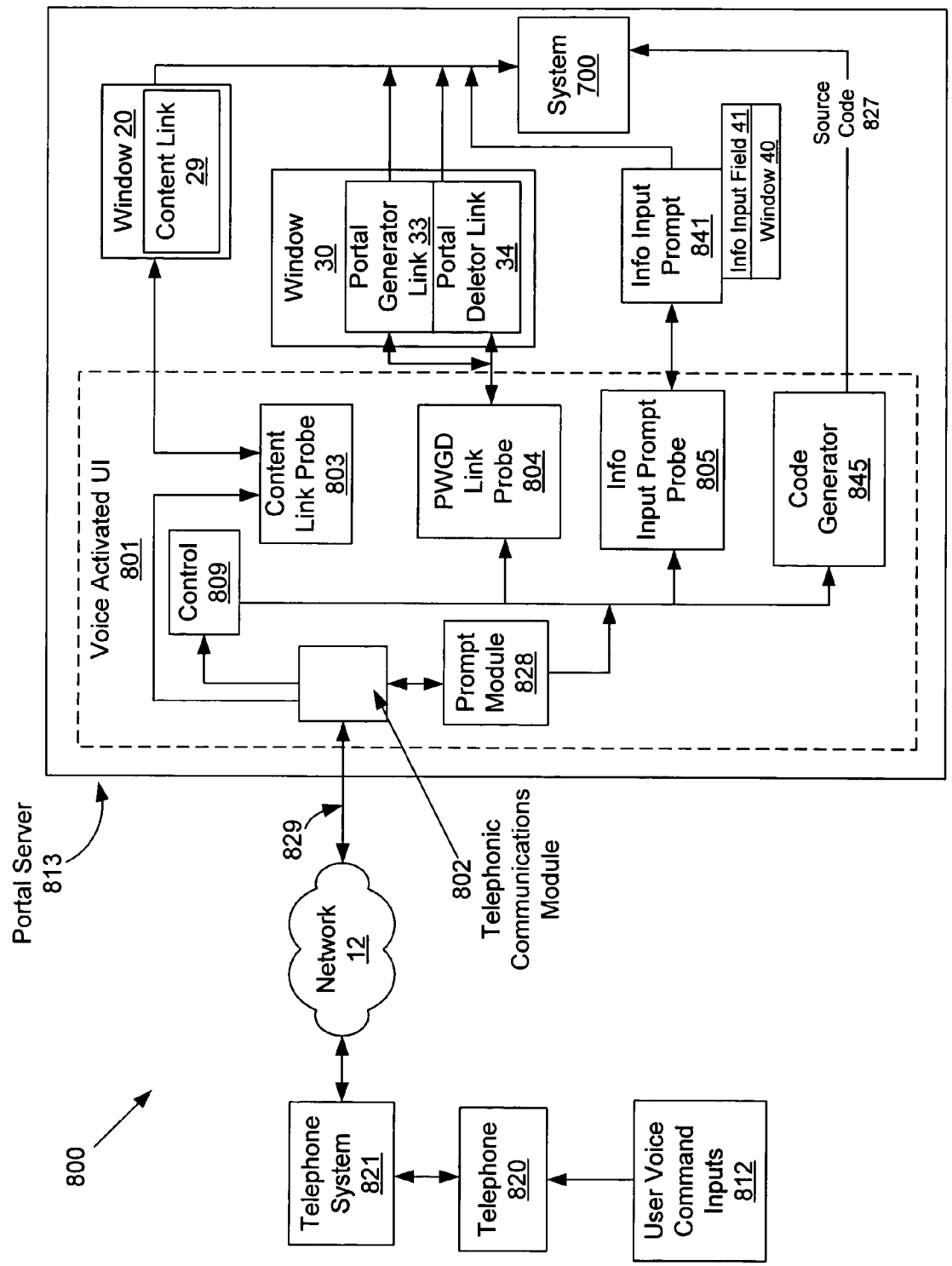
FIG. 8 shows a voice and/or text activated user interface for a system for providing user defined portal channels, in accordance with an embodiment of the invention.

In one embodiment, a portal is interactively displayed to a user on a monitor associated with a client computer, wherein a GUI can be used to allow a user thereof to interact with the portal, such as by completing an entry in channel name field 41 and/or making a selection from menu 42. Other user interfaces can also effectuate this interaction. For instance, in one embodiment, rather than the client computer, a telephone is used to interact with the portal server. In this embodiment, a voice or text activated user interface (e.g., the voice or text activated interface 800; FIG. 8) allows a user of the telephone to interact with the portal using voice or text commands.

Figure 5:
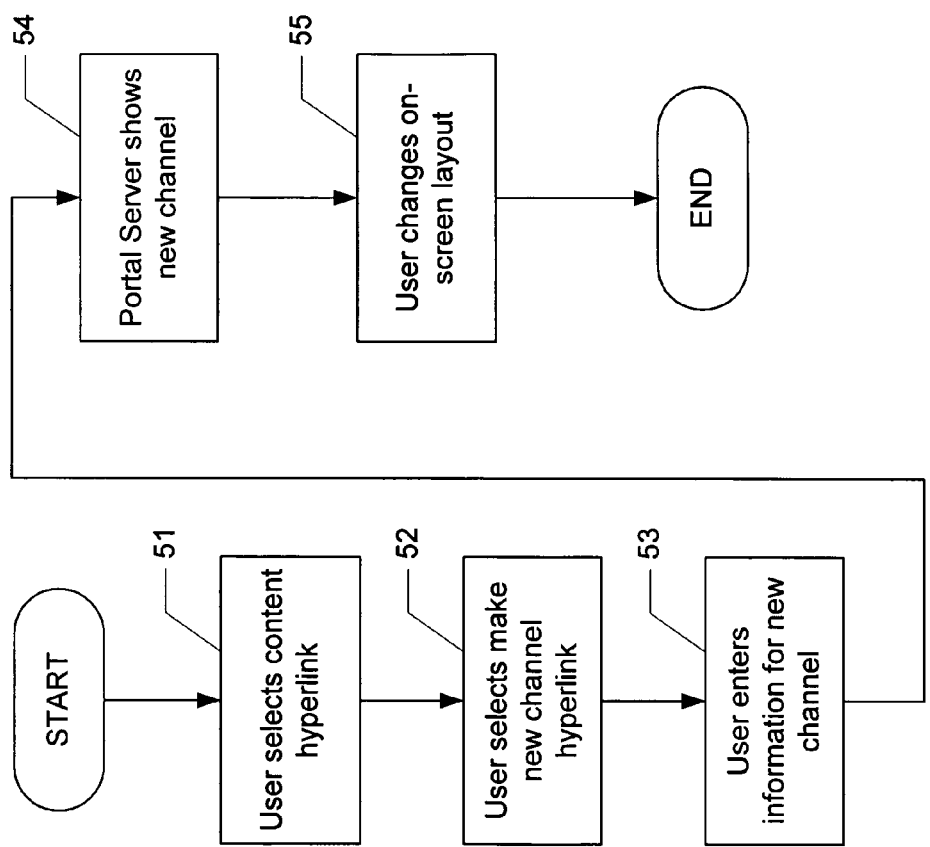
FIG. 5 shows a flowchart of a process for creating a new channel, in accordance with an embodiment of the invention.

FIG. 5 shows a flowchart of a process for creating a new portal channel, according to one embodiment of the present invention. The process begins with step 51, wherein a user interacts with the portal so as to ascertain channel availability and to display a link for channel creation. This is accomplished, in one embodiment, by clicking on a content hyperlink, so as to display the channels available and a channel creation link. In one embodiment, this accomplished by voice or text command, for instance telephonically.

Upon ascertaining which channels are available, a user may decide to create a new one. In step 52, a user takes an action to apprise the portal that a new channel is to be made and accessing means such as a window or voice or text command. This is accomplished in one embodiment by clicking on a 'make new channel' hyperlink, so as to display an interactive window for making the new channel. In one embodiment, this is accomplished by voice or text command, for instance telephonically.

Upon apprising the portal that a new channel is to be made and accessing means by which to create the channel, a user creates the new channel. In step 53, the user enters information to generate the new channel. This is accomplished in one embodiment by entering information in a completable field, such as to name the new channel, and/or making selections from an interactive menu, such as to choose from those available from the portal what type of channel the new channel will comprise. In one embodiment, this is accomplished by voice or text command, for instance telephonically.

In step 54, the newly created channel is displayed when shown by the portal server. In one embodiment, the user can optionally change the layout of this display in step 55.

Figure 6:
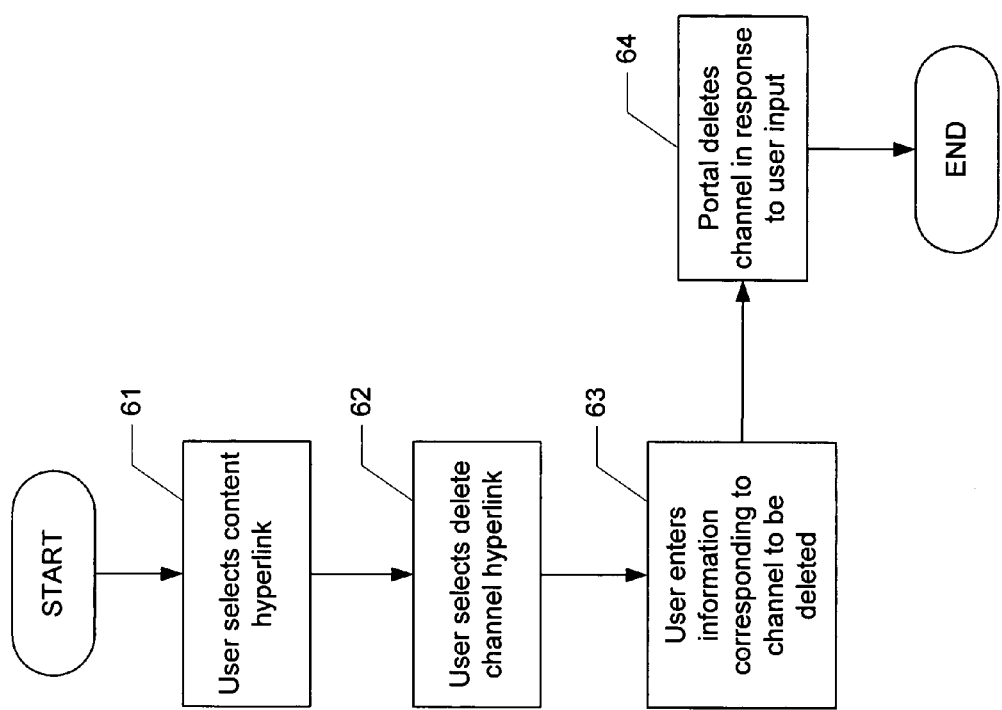
FIG. 6 shows a flowchart of a process for deleting a channel, in accordance with an embodiment of the invention.

FIG. 6 shows a flowchart of a process for deleting a portal channel, according to one embodiment of the present invention. The process begins with step 61, wherein a user interacts with the portal so as to ascertain channel availability. This is accomplished, in one embodiment, by clicking on a content hyperlink, so as to display the channels available and a channel deletion link. In one embodiment, this accomplished by voice or text command, for instance telephonically.

Upon ascertaining which channels are available, a user may decide to delete one. In step 62, a user takes an action to apprise the portal that a channel is to be deleted and accessing means such as a window or voice or text command. This is accomplished in one embodiment by clicking on a 'delete channel' hyperlink, so as to display an interactive window deleting the channel, or by highlighting a channel to be deleted. In one embodiment, this is accomplished by voice or text command, for instance telephonically.

Upon apprising the portal that a channel is to be deleted and accessing means by which to delete it, a user deletes the channel. In step 63, the user enters information for the channel to be deleted. This is accomplished, in one embodiment, by entering information in a field, such as naming the channel to be deleted, and/or by making selections from an interactive menu, such as to choose from existing channels one which is to be deleted. In one embodiment, this is accomplished by voice or text command, for instance telephonically. In step 64, the channel is deleted accordingly.

Figure 7:
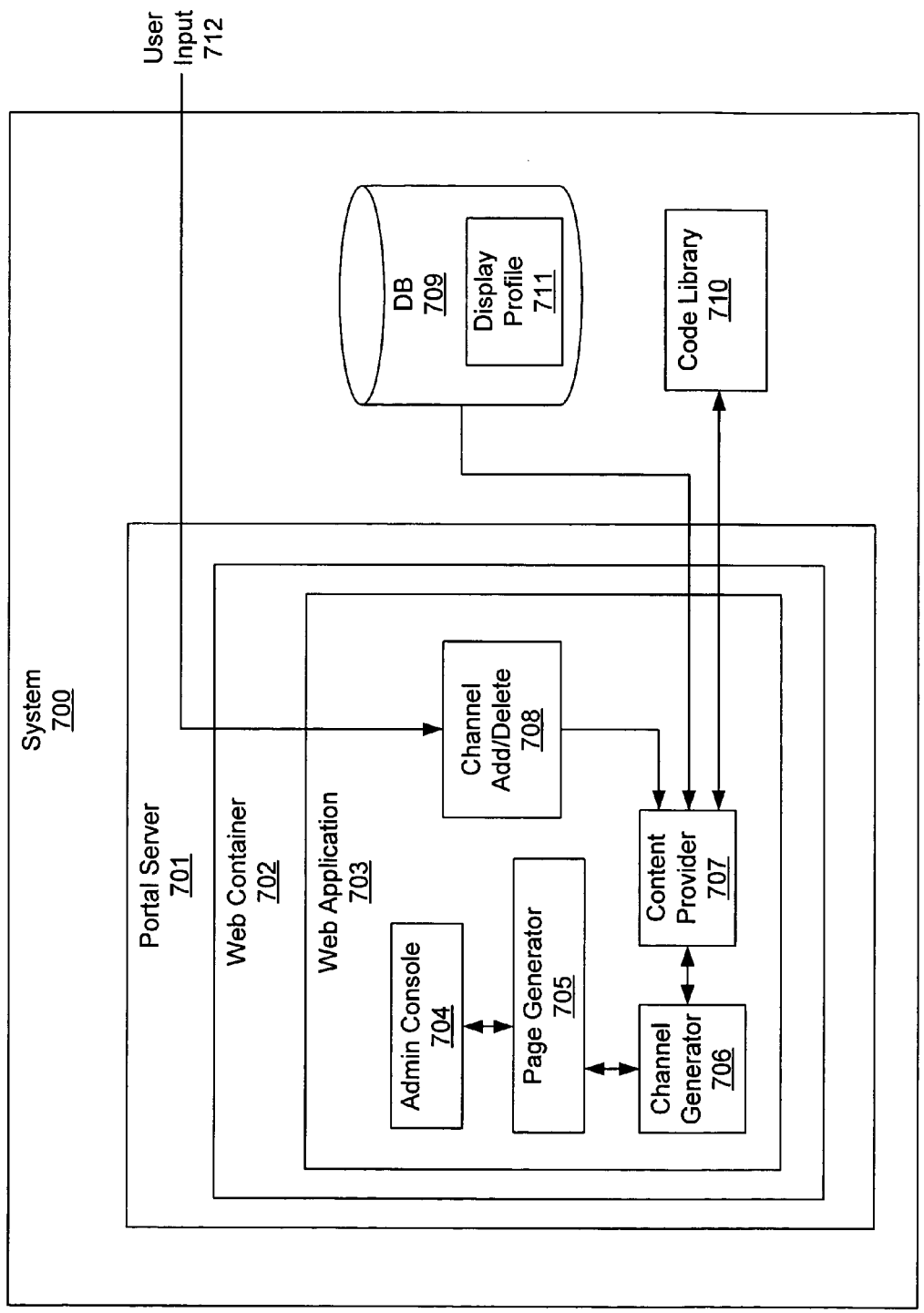
FIG. 7 shows a system for providing user defined portal channels, in accordance with an embodiment of the invention.

FIG. 7 shows a system 700 for providing user defined portal channels, according to one embodiment of the present invention. The system 700 includes a portal server 701 having, in one embodiment, a Web container 702. The Web container 702 has a Web application 703 therein.

In another embodiment, another program holds and executes command sets and/or runs other software routines instead of the Web container 702, so as to allow the system 700 to function in a network environment different from a Web environment. In this embodiment, an application other than a Web application characterizes the Web application 703 so as to provide a networking functionality analogous to that performed in one embodiment by the Web application 703.

The Web application 703 includes an administration console 704. The administration console 704 provides means for a network administration entity (e.g., a network administrator) to program and control aspects of the portal server 701 functions and/or operations.

A page generator 705 generates Web pages and/or other data structures characterized by Hypertext Markup Language (HTML) or a similar structure. Such Web pages can include channels (sometimes referred to as "portal window") made available by portal server 701.

Channels are generated, in one embodiment, by a channel generator 706. The data content including the channels comes from a content provider 707. The content provider 707 obtains information to generate content from a database 709. In one embodiment, the database 709 comports substantially with the Lightweight Directory Access Protocol (LDAP). In another embodiment, another database provides the content provider 707.

The data provided by the content provider 707 is formatted according to a display profile 711, which can include a portion of the database 709. In one embodiment, the source code involved with the display profile 711 is rendered in an Extensible Markup Language such as XML. Such source code can be retrieved by the content provider 707 upon forming a new channel.

A channel add/delete module 708 causes the content provider 707 to retrieve the code from the code library 710 and information from the display profile 711 in response to a user input 712 to create a new channel. In response to a user input 712 to delete a channel, corresponding code and data removal functions take place.

In one embodiment, some functions of system 700, such as displaying, creating, and/or deleting channels are performed by a computer operating under the control of computer-readable program code. Such code can be rendered in any of a number of computer languages. In one embodiment, such code includes XML code. A display profile document that can be written by the system 700 can have a format that can be illustrated by the exemplary lines in Table 1, below, defining a bookmark channel.

TABLE 1

Exemplary XML Code for Defining a Bookmark Channel

```
<?xml version="1.0" encoding="utf-8" standalone="no"?>
<!DOCTYPE DisplayProfile SYSTEM "jar://resources/psdp.dtd">
<DisplayProfile version="1.0" priority="0">
  <Properties/>
  <Channels>
    <Channel name="Bookmark" provider="BookmarkProvider">
      <Properties>
        <String name="title" value="My Bookmarks"/>
        <String name="refreshTime" value="600" advanced=
          "true"/>
        <ConditionalProperties condition="client" value="HTML">
          <Collection name="targets">
            <String value="Sun home page|http:
              //www.sun.com"/>
```

TABLE 1-continued

Exemplary XML Code for Defining a Bookmark Channel

```
            <String value="Sun Java System home
              page|http://www.sun.com/software"/>
          </Collection>
        </ConditionalProperties>
      </Properties>
    </Channel>
  </Channels>
  <Providers>
    <Provider name="BookmarkProvider"
      class="com.sun.portal.providers.bookmark.BookmarkProvider">
      <Properties>
        <String name="title" value="Bookmark Provider"/>
        <String name="windowPref" value="all_new"/>
        <String name="width" value="thin" advanced="true"/>
        <Boolean name="isEditable" value="true" advanced="true"/>
        <String name="editType" value="edit_subset" advanced=
          "true"/>
        <String name="description" value="Bookmark Channel
          Provider Sample Implementation"/>
        <String name="refreshTime" value="0" advanced="true"/>
        <ConditionalProperties condition="client" value="HTML">
          <ConditionalProperties condition="locale" value="en">
            <String name="helpURL" value=
              "en/desktop/bkmark.htm" advanced="true"/>
          </ConditionalProperties>
          <String name="helpURL" value=
            "en/desktop/bkmark.htm" advanced="true"/>
          <Collection name="targets">
            <String value="Sun home page|http://www.sun.com"/>
          </Collection>
        </ConditionalProperties>
        <String name="fontFace1" value="Sans-serif"/>
        <String name="productName" value="Sun Java System Portal
          Server"/>
      </Properties>
    </Provider>
  </Providers>
</DisplayProfile>
```

FIG. 8 shows a system 800 having a voice activated user interface 801 for allowing an end user to cause the portal server 813 to create and delete channels. The voice or text activated interface 801 can be used to provide the end user voice or text command inputs 812 to the portal server 813, for instance, telephonically. In one embodiment, the telephone system 821 connects to the portal server 813 via the network 12.

In one embodiment, an end user accesses the portal server 813 using a telephone 820. The telephone 820 connects to the portal server 813 telephonically via a telephone system 821. The telephone 820 can connect to the portal server 813 wirelessly or via telephone lines (i.e., land lines). The telephone 820 can connect to the portal server 813 using legacy telephony and/or by other technologies, including for instance Voice Over Internet Protocol (VOIP). For example, the telephone 820 can include a digital telephone, a legacy telephone, or another telephone.

The telephonic communication module 802 couples telephone signals 829 into and from the voice or text activated user interface 801. A control module 809 allows settings to be made and/or changed to the telephonic communication module 802, to the probes 803-805, and to the code generator 845 (all discussed below), and in one embodiment serves as a central processing unit (CPU) for the voice or text activated user interface 801. The prompt module 828 controls the telephonic communications module 802 for switching prompts and user commands 812 between the probes 803-805 and the telephone 820.

The contact link probe 803 provides a mechanism for an end user to access the content link 29 telephonically and to input a voice command 812 (or e.g., a key command) using the telephone 820 thereto so as to gain access to the window 30 (see FIG. 3). A Channel generating/deleting (PWGD) probe 804 translates information such as the content of window 30 into a synthetic voice or other prompt for sending a list of active and non-active channels (e.g., the list 31; FIG. 3) to the telephone 820 for listening by the end user. This can also be achieved using text commands and display. In one embodiment, the voice activated and text interface features described herein are selectable.

The PWGD probe 804 also allows the user to submit a voice, text, or key command from the telephone 820 to the window 30 and selectively, to the channel generating link 33 or to the channel deleting link 34 therein, so as to access the window 40 (see FIG. 4). Responsively, the voice activated user interface 801 allows the user to interact with the information input field 41 (see FIG. 4) via an information input prompt 841.

The information input prompt 841 interacts with the code generator 845 to translate voice commands (or e.g., key commands) from the telephone 820 or other inputs into code functionally similar to the code handled by information input field 41. The code generator 845 generates source code 827, which can be used by the system 700 (see FIG. 7) to generate a new channel and/or to delete an existing channel according to a voice or text command 812 from the telephone 820. In one embodiment, the functions of the code generator 845 are provided by the system 700.

In summary, an embodiment of the present invention provides a computer implemented method for generating a channel by a remote end user. The method begins with the end user accessing a portal server via a network using a client computer (or e.g., a telephone). The user can interact with a content link of the portal server. Responsive to interacting with the content link, a channel generating link or a channel deleting link is accessed. Upon interacting with the channel generating link or the channel deleting link, an information inputting interface is accessed, which allows the end user to input information to the portal server. The information describes the channel to be generated or deleted. The channel is generated or deleted in response to inputting information describing the channel to the portal server. In one embodiment, the method described above for selectively generating and deleting a channel by a remote end user is performed by a computer system or a network of computer systems under the control of computer readable program code. In one embodiment, the computer readable program code is embodied in a computer usable medium.

One embodiment of the present invention provides a computer based system for selectively generating and deleting a channel by a remote end user. The system includes a content provider for furnishing code including the channel. The remote end user can interact with the computer based system for selectively generating and deleting a channel via a network, which can be the Internet or an intranet, a wide area network (WAN), or other network, using a client computer or a voice or text activated interface, for instance, telephonically.

One embodiment of the present invention provides a computer controlled programming tool having a graphical user interface (GUI), which provides a vehicle for an end user to selectively generate and delete a channel. Another embodiment of the present invention provides a computer controlled programming tool having a voice or text activated user interface, which provides a vehicle for an end user to selectively generate and delete a channel, for instance telephonically.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating channels for displaying channel content for a portal by a user, comprising:
   accessing a portal server for the portal via a network using a client computer;
   accessing, at a first time, a channel generating link in response to the user interacting with a content link of the portal server;
   accessing, at the first time, an information inputting interface in response to the user interacting with the channel generating link;
   inputting first information to the portal server using the information inputting interface wherein said first information describes a first channel;
   generating the first channel in response to the inputting the first information to the portal server;
   accessing, at a second time, the channel generating link in response to the user interacting with the content link of the portal server;
   accessing, at the second time, the information inputting interface in response to the user interacting with the channel generating link;
   inputting second information to the portal server using the information inputting interface wherein said second information describes a second channel; and
   generating the second channel in response to the inputting the second information to the portal server; and
   displaying the first channel and the second channel in separate portions of a web browser,
   wherein the first channel displays content from a first-service type and the second channel displays content from a second-service type.

2. The method of claim 1, wherein displaying the first channel is performed upon refreshing the browser window.

3. The method of claim 1, wherein the information inputting interface comprises a graphical user interface.

4. The method of claim 1, wherein the information inputting interface comprises at least one selected from the group consisting of a voice activated interface and a text interface.

5. The method of claim 1, wherein the content for the first channel is provided by a first content provider.

6. The method of claim 1, wherein the channel generating link is displayed with a list of selected and non-selected channels, wherein the list comprises a third channel.

7. The method of claim 1, wherein the information inputting interface comprises a field for entering an identifier of the first channel and an interactive list for classifying the first channel.

8. A computer usable medium having a computer readable program code embodied therein for causing a computer system to execute a method for selectively generating channels by a user, comprising:
   accessing a portal server via a network using a client computer;
   accessing, at a first time, a channel generating link in response to the user interacting with a content link of the portal server;
   accessing, at the first time, an information inputting interface in response to the user interacting with the channel generating link;

inputting first information to the portal server using the information inputting interface wherein said first information describes a first channel;
generating the first channel in response to the inputting the first information to the portal server;
accessing, at a second time, the channel generating link in response to the user interacting with the content link of the portal server;
accessing, at the second time, the information inputting interface in response to the user interacting with the channel generating link;
inputting second information to the portal server using the information inputting interface wherein said second information describes a second channel; and
generating the second channel in response to the inputting the second information to the portal server; and
displaying the first channel and the second channel in separate portions of a web browser,
wherein the first channel displays content from a first-service type and the second channel displays content from a second-service type.

9. The computer usable medium of claim 8, wherein displaying the first channel is performed upon refreshing the browser window.

10. The computer usable medium of claim 8, wherein the information inputting interface comprises a graphical user interface.

11. The computer usable medium of claim 8, wherein the information inputting interface comprises at least one selected from the group consisting of a voice activated interface and a text interface.

12. The computer usable medium of claim 8, wherein the content for the first channel is provided by a first content provider.

13. The computer usable medium of claim 8, wherein the channel generating link is displayed with a list of selected and non-selected channels, wherein the list comprises a third channel.

14. The computer usable medium of claim 8, wherein the information inputting interface comprises a field for entering an identifier of the first channel and an interactive list for classifying the first channel.

15. A method for deleting a channel by a user, comprising:
accessing a portal server via a network using a client computer;
accessing a channel deleting link in response to the user interacting with a content link of the portal server;
accessing an information inputting interface in response to the user interacting with the channel deleting link;
inputting information to the portal server using the information inputting interface, wherein the information describes the channel; and
deleting the channel in response to inputting information to the portal server,
wherein the information inputting interface comprises a voice activated interface.

16. An apparatus comprising:
a first window for displaying an interactive content link allowing a user to access a portal server to selectively generate and delete a channel;
a second window for displaying an interactive channel generating link, the second window displayed in response to the user accessing the portal server to selectively generate and delete a channel, the interactive channel generating link allowing the user to access an interactive information inputting field for selectively generating and deleting the channel;
a third window for displaying the interactive information inputting field allowing the user to input information to the portal server, the information relating to the channel; and
a code generator for generating program code for selectively creating and deleting the channel in response to the information input.

17. The apparatus of claim 16, wherein the first window further displays a channel.

18. The apparatus of claim 16, wherein the second window further displays a list of selectable channels.

19. The apparatus of claim 18, wherein the second window further displays a list of selected available channels.

20. The apparatus of claim 19, wherein the second window further displays a list of non-selected available channels.

21. The apparatus of claim 16, wherein the first window comprises a browser window.

22. The apparatus of claim 16, wherein the first, the second, and the third windows are displayed to the user upon a monitor coupled to a remote client computer and wherein the code generator is disposed within the portal server.

23. The apparatus of claim 16, wherein the third window further displays an interactive menu of type choices for describing the channel.

24. An apparatus comprising:
a first mechanism for telephonically accessing an interactive content link allowing an user to access a portal server in response to a first voice command from the user to selectively generate and delete a channel;
a second mechanism for telephonically accessing an interactive channel generating link, the second mechanism activated in response to the first voice command, the interactive channel generating link allowing the user to telephonically access by a second voice command an interactive information inputting prompt for selectively generating and deleting the channel;
a third mechanism for telephonically accessing an interactive information inputting prompt, in response to the second voice command, wherein the interactive information inputting prompt allows the user to input information to the portal server using a voice input, the information relating to the channel; and
a code generator for generating program code for selectively creating and deleting the channel in response to the information input.

25. The apparatus of claim 24, wherein the second mechanism further lists available channels.

26. The apparatus of claim 25, wherein the second mechanism further lists selected available channels.

27. The apparatus of claim 26, wherein the second window further displays a list of non-selected available channels.

28. The apparatus of claim 24, wherein the first, the second, and the third mechanisms are telephonically provided to the user using a remote telephone and wherein the code generator is disposed within the portal server.

* * * * *